United States Patent [19]

Olsson

[11] 4,063,523
[45] Dec. 20, 1977

[54] SOIL STABILIZING APPARATUS

[76] Inventor: Gunnar O. H. Olsson, Svartkarrsvagen 24, S-133 00 Saltjobaden, Sweden

[21] Appl. No.: 735,363

[22] Filed: Oct. 26, 1976

Related U.S. Application Data

[63] Continuation-in-part of Ser. No. 567,027, April 10, 1975, abandoned, which is a continuation of Ser. No. 408,016, Oct. 19, 1973, abandoned.

[51] Int. Cl.² .............................................. A01C 23/02
[52] U.S. Cl. ........................................ 111/7; 172/100; 61/36 B
[58] Field of Search .................. 404/92; 111/6–7, 111/11; 172/59, 102, 110, 100; 61/36

[56] References Cited

U.S. PATENT DOCUMENTS

| 3,404,644 | 10/1968 | Vissers | 111/11 |
| 3,413,940 | 12/1968 | Vissers | 111/7 |
| 3,670,670 | 6/1972 | Vissers | 172/102 X |
| 3,700,036 | 10/1972 | Reuber | 172/110 X |
| 4,018,170 | 4/1977 | van der Lely | 111/7 |

FOREIGN PATENT DOCUMENTS

| 1,557,789 | 1/1970 | Germany | 172/100 |
| 689,754 | 1/1953 | United Kingdom | 111/7 |

*Primary Examiner*—Robert E. Bagwill
*Attorney, Agent, or Firm*—Sughrue, Rothwell, Mion, Zinn and Macpeak

[57] ABSTRACT

A method and apparatus for stabilizing the soil, wherein materials are injected into the soil in closed paths along substantially straight lines.

19 Claims, 22 Drawing Figures

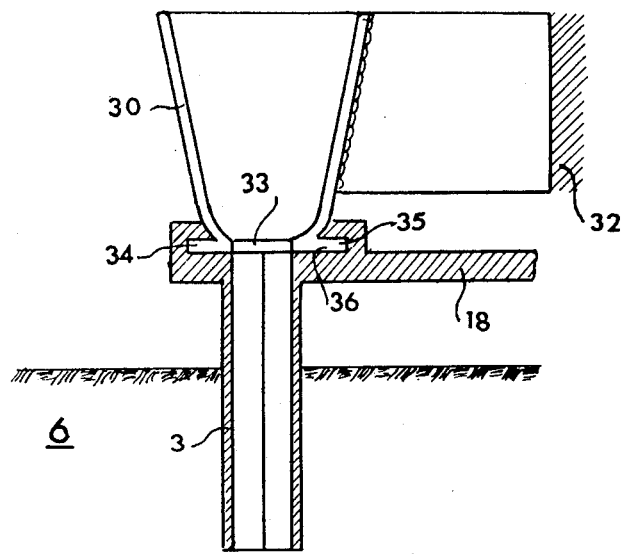
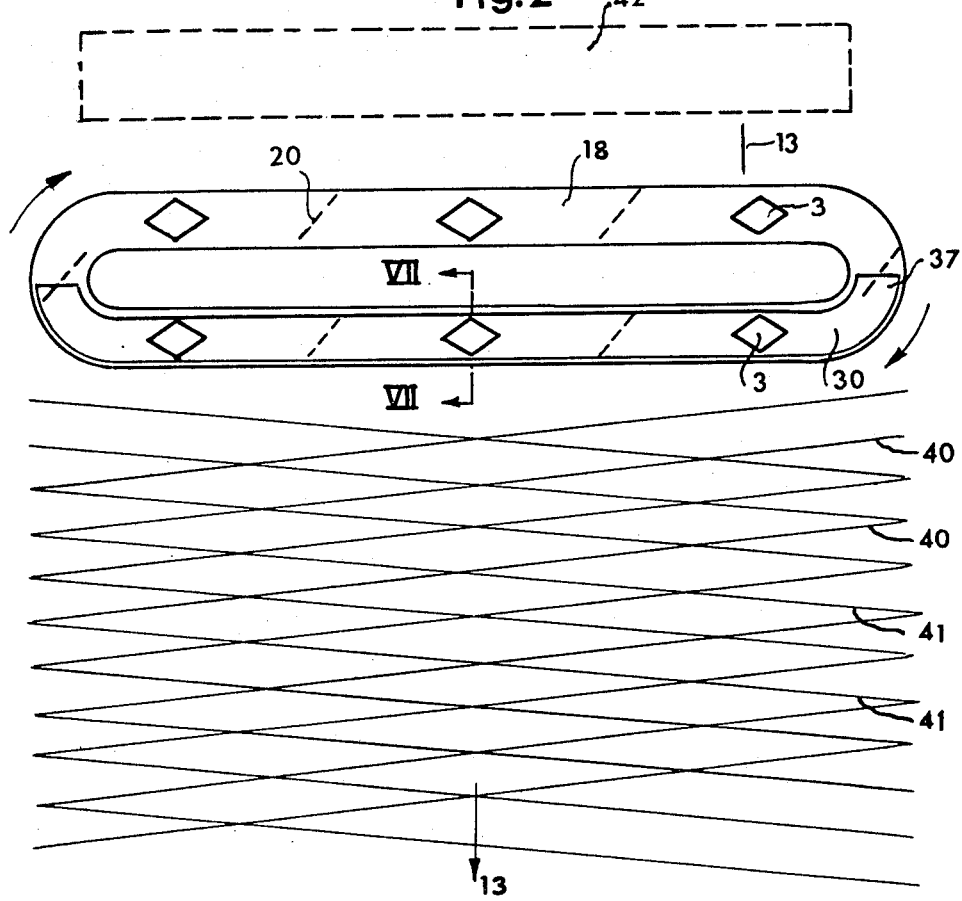

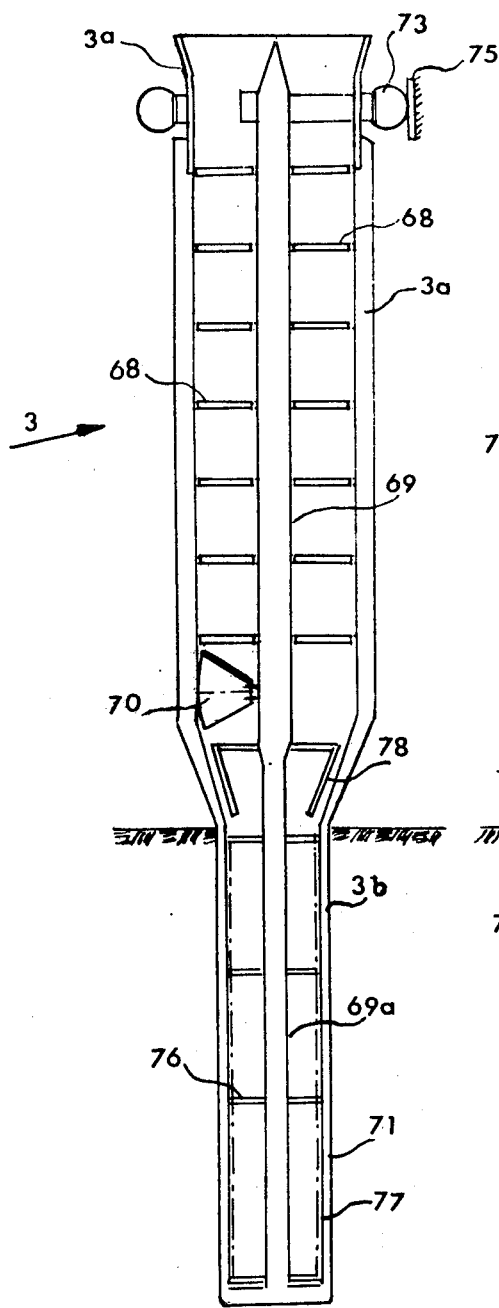
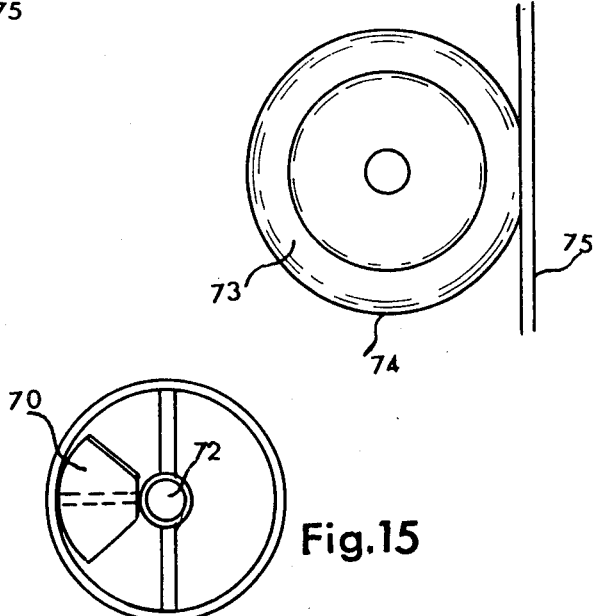
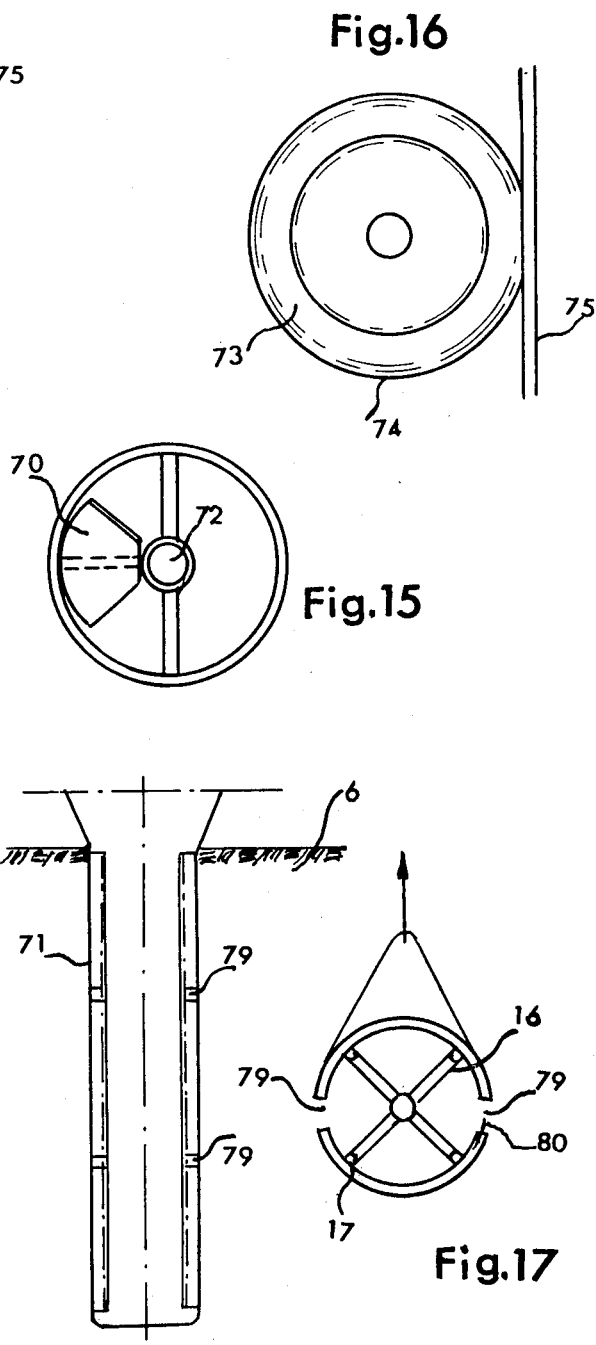
Fig.13  Fig.14

Fig.18
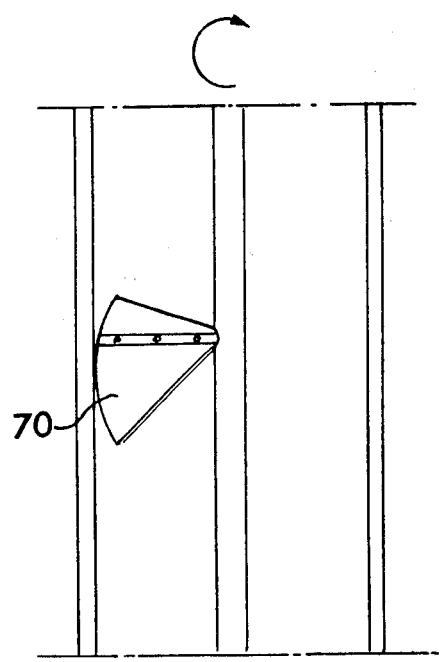
Fig.20
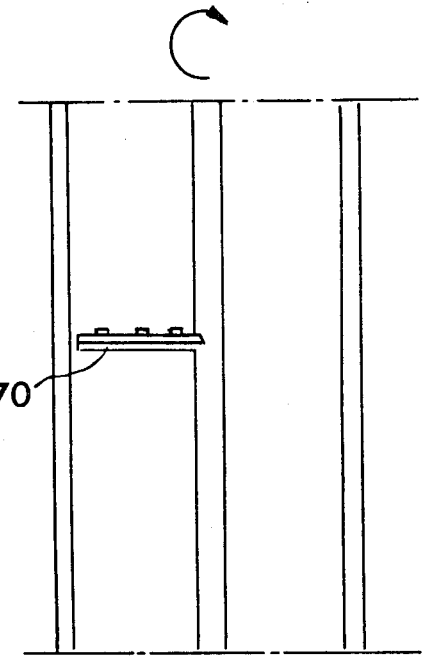
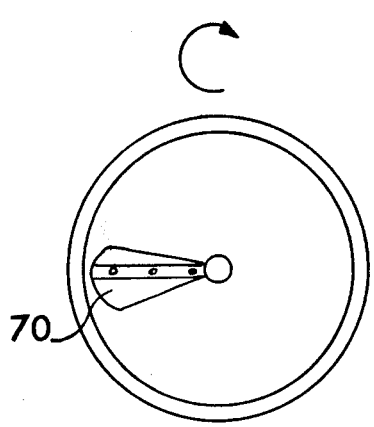
Fig.19
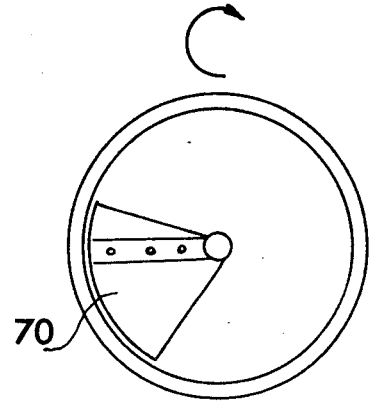
Fig.21

SOIL STABILIZING APPARATUS

This application is a continuation-in-part of Ser. No. 567,027, filed Apr. 10, 1975 and now abandoned, which was a continuation of Ser. No. 408,016, filed Oct. 19, 1973, and also abandoned.

The invention relates to a method and an apparatus for mixing a soil stabilizing material in solid or liquid form into a soil course, including a carrier transportable over the surface of the soil, having a plurality of material injecting members. The carrier is mounted on a mobile vehicle, and is arranged to move the material injecting members through the soil course in a closed path. The material injecting members are provided with at least one opening for disposing of the soil stabilizing material. The soil stabilizing material consists, for example, of cement, gypsum, or a liquid material.

When stabilizing a soil course, it has been usual to distribute the stabilizing substance (e g cement) in a layer on the soil, and thereafter to work the cement into the soil course to a definite level using different machines to accomplish the necessary stabilization after the cement has set. Such a stabilizing process contains large problems, as mixing-in must be done extremely carefully to obtain the correct mixture giving required stability, and this means that mechanical processing will be very time-consuming. It is further necessary to apply the stabilizing material to a greater extent than what is required for the theoretically best mixture, as a certain amount of the stabilizing material generally remains un-mixed, or is wasted in some other way. In practice this means that soil stabilization with conventional methods and equipment is very expensive.

It is moreover known to use machines with injecting members which are moved at a substantially constant speed through the soil course in a closed circular path. Material injection will however be extremely uneven, as is expained below in connection with the drawings.

OBJECT OF THE INVENTION

The purpose of the invention is therefore to accomplish an apparatus and a method which ensure that the least possible amount of admixing material need be introduced into the soil course, bringing with it good admixture in the least possible time.

This purpose is completely realized by the invention defined in the claims, and which is described below in connection with the appended drawings.

DESCRIPTION OF THE DRAWINGS

The drawings illustrate, in

FIG. 1 shows in a simplified manner a circular disk or other carrier 2, rotatable about a shaft 1. The disk is mounted with the shaft 1 vertical in a vehicle which can be moved over the soil surface. Around its periphery, disk 2 is provided with material injecting members 3, having for example the shape which is described below in connection with the device according to the invention. For the sake of simplicity, the circularly operating apparatus shown in FIG. 1 is described in connection with material injecting members of the kind shown in FIGS. 2 and 3.

As may be seen from FIG. 3, the endless carrier 18, which will be described below, is situated at a certain distance from the soil surface 4 when the material injecting members 3 are in the working position. Using means not shown, carrier 18 together with injecting members 3 is liftable to an upper position in which members 3 go free from the soil surface 4 and lowerable to a working position with the members 3 pressed to the desired depth into soil course 6. The members 3 are adapted to be raisable and lowerable relative to the soil surface as will be described below. Each material injecting member 3 has a forward, preferably wedge-like portion 5 adapted to facilitate moving member 3 through a soil course 6 of 50 cm thickness, for example. As may best be seen from FIGS. 3 and 4, member 3 is hollowly shaped and projects down a pre-determined depth into the soil course 6. The rear portion of member 3 is provided with an opening 7, through which material 8, e g cement, fed through an upper opening 9 is introduced into the soil course 6.

Figure 1:
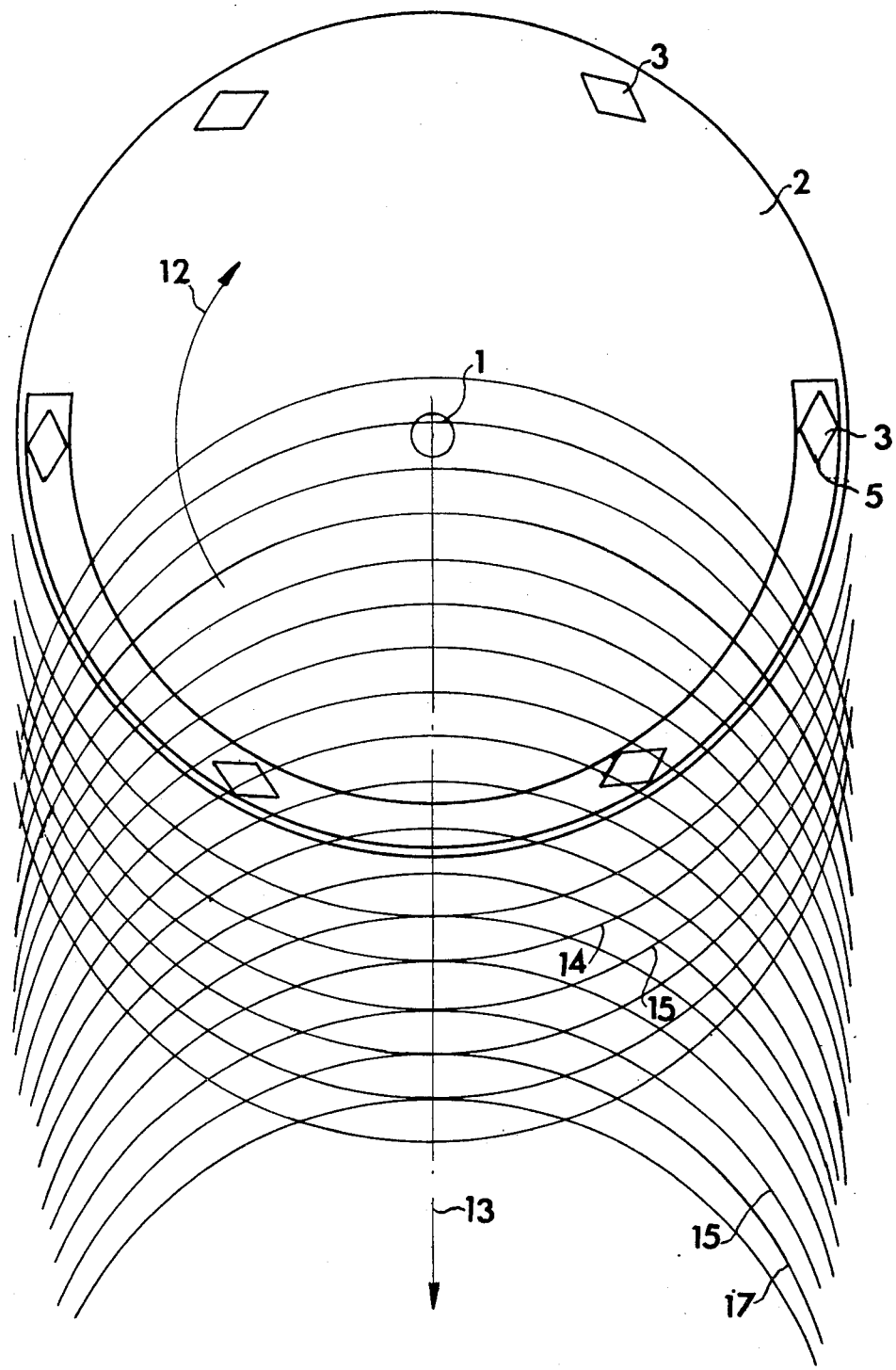
FIG. 1, an extremely simplified principle for a known device for injecting material into a soil course and for mixing-in the material, FIG. 2, a simplified embodiment of an apparatus according to the invention, FIG. 3, a vertical section through a material injecting member, FIG. 4, a section to an enlarged scale along line IV—IV in FIG. 3, FIG. 5, a material injecting member intended for the introduction of liquid material, FIG. 6, a section to an enlarged scale along the line VI—VI in FIG. 5, FIG. 7, a section to an increased scale along the line VII—VII in FIG. 2, FIG. 8, a detail of a chain-like carrier provided with injecting members, seen from above, FIG. 9, a side-view of a portion of the carrier and a material injecting member, FIG. 10, a vehicle provided with an apparatus according to the invention, FIG. 11, a simplified plane view of an apparatus according to the invention to be connected to the vehicle of FIG. 10, FIG. 12, a side view partly broken away of the apparatus of FIG. 11, FIG. 13, a side view of a material injecting member of the apparatus, having its forward wall broken away, FIG. 14, a view through the outlet portion of the material injecting member, FIGS. 15–17, details of the injector member of FIG. 13, FIG. 18, a side-view of a propeller-shaped feeding element of a material injecting member according to FIG. 13, FIG. 19, a plane view of the element of FIG. 18, FIGS. 20 to 21, views corresponding to FIGS. 18 and 19, respectively, but disclosing elements provided with substantially horizontal propeller blades, and FIG. 22, a view which in a simplified manner discloses the material distribution in the soil course after a passage of the apparatus according to the invention.
Figure 3:
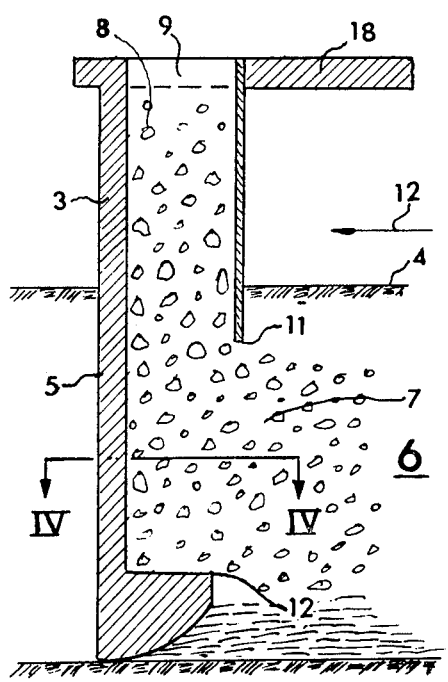
Figure 4:
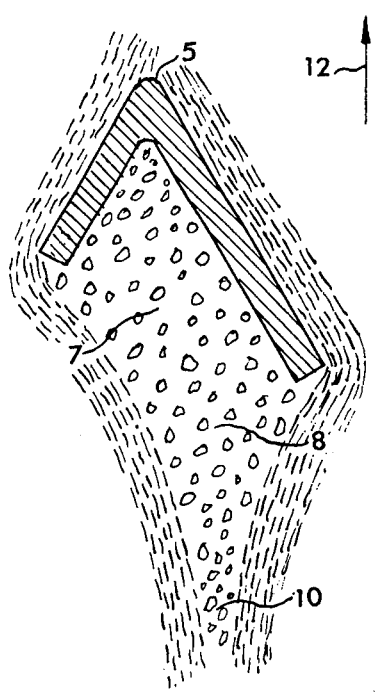
FIG. 4 illustrates how material 8 flows out through opening 7 forming a ribbon 10 having a height determined by the distance between the upper edge 11 and the lower edge 12 of the opening and a width which is determined by the width of member 3 and the nature of soil course 6.

In the embodiment shown in FIG. 1 there are six material injecting members mounted along the periphery of disk 2, and when the disk, rotating round shaft 1 in the direction of arrow 12 (FIG. 1), is moved forward in the direction of arrow 13, the material injecting members 3 situated in front of shaft 1, reckoned in the direction of forward movement, will cut through the soil course 6 in curved paths, substantially as illustrated by curves 14 and 15 for example, in FIG. 1, while those material injecting members 3 lying behind shaft 1 in the direction of movement will make curved tracks in the soil course 6, as shown by curves 16 and 17, for example.

If FIG. 1 is considered, it may be seen that a material injecting member 3 on the right hand side of the figure is moved relative to the ground at a speed which is a function of the sum of the speed of the member and that of the vehicle, while a material injecting member 3 on the left hand side of the figure is moved relative to the ground at a speed which is a function of the difference between both the speeds. When soil stabilizing material is being delivered with a constant amount per unit of time, the soil course on the right hand side of the figure will be supplied with considerably less stabilizing material than the soil course on the left hand side, it thereby not being possible to obtain even soil stabilization with the least possible amount of material.

In practical attempts, it has further been found that material injection members in the known device according to FIG. 1 have a tendency to displace the soil course sideways during a part of the movement, due to the combined circular and linear movement. This means that very large side-forces arise which can cause damage to the material injecting members.

Figure 8:
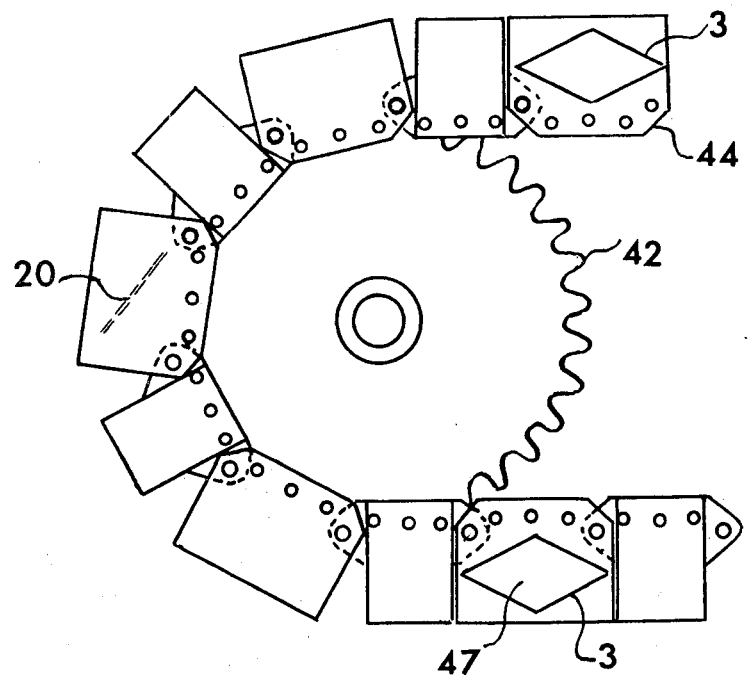
Figure 9:
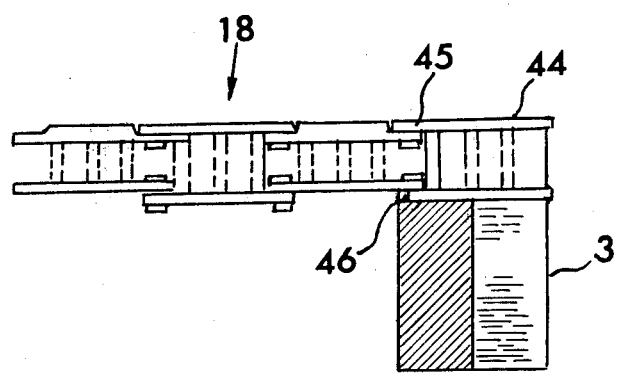

These problems with the known device are eliminated according to the invention, which is shown in a simplified manner in FIG. 2, and includes a device which moves the material injection members 3 in a substantially straight line. The material injecting members 3 lying furthermost forward in the direction of travel denoted by arrow 13 are fed with soil stabilizing material from a trough 30, for example, and are moved along the lines 40, sloping from the right down to the left, while members 3 lying furthest to the rear in the direction of forward travel are moved along the sloping lines 41. It should be noted that the path traced by each material injecting member 3 of FIG. 2 would not exactly be that shown, but would consist of long straight lines joined by 180° trochoidal motions at each end. The rear members 3 then work as mixing means to mix the soil course and the introduced material to a homogenous mixture. The carrier 18, which consists for example of interconnected links as shown in FIGS. 8 and 9, pivotable in relation to each other, running over two supporting pulleys, pulley 42 for example, or the like, can carry out heavy processing of the soil course and the stabilizing material if it is provided with mixer arms, vanes 20, or the like, which are pressed down into the soil course and follow the movement of the members 3. As illustrated in FIGS. 8 and 9 the carrier 18 consists of a chain-like structure with upper and lower links, 45 and 46, respectively. Some of the pairs of upper and lower links carry material injection members 3 having the inlet openings 47 (FIG. 9) in the surface plane of the upper link 45. Said surface of the respective upper links move directly below the open bottom of the material feed trough, for example the trough shown in FIG. 7 and, thus, material is continuously supplied to the moving material injection members.

A machine for carrying out the method described above is shown in FIGS. 10 to 22.

As may be seen from FIG. 2, the endless carrier 18 is drawn clockwise by a driving means (not shown), connected to pulley 42 along two linear lengths of movement, substantially parallel to each other, these being connected at the ends by two semicircular lengths of movement having the least possible radius. Even if the linear lengths of movement are shown as being at right angles to the vehicle's direction of travel 13, it is obvious that this need not be the case. What is essential is that the speed of the vehicle combined with the speed of one of the material injecting members results in a substantially linear movement of the respective material injecting member within its working area. With the illustrated embodiment, having material feed only within the area for the foremost members 3, the radius at the end has no importance from the point of view of material distribution.

Figure 5:
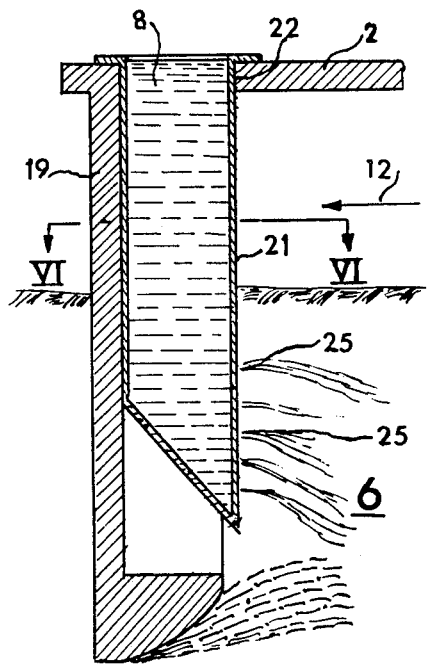
Figure 6:
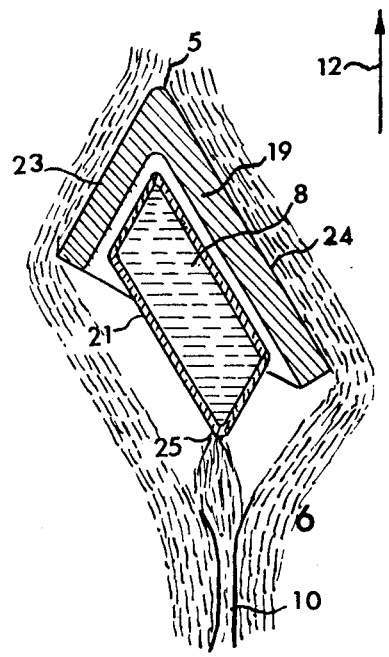

A material injecting member 19 having a loose insert 21 is illustrated in FIG. 51. The member 19 forms here an integral part of a link on the carrier 18 which is provided with an opening 22 for the insert 21. As may best be seen from FIG. 6, the material injecting member 19 in this embodiment has a V-shaped cross-section having a short side 23 and a long side 24, between which sides the tubular insert 21 is placed. The insert shown in FIGS. 5 and 6 is intended for a liquid material which is introduced into the soil course 6 through holes 25 located on the rear edge of insert 21 in the direction of movement 12. These holes can be so suited to the soil course 6 that substantially the same amount of material admixture is obtained at different levels in the soil course. Openings 25, shown, can also be replaced by a continuous slot or the like. The size of the holes 25 or the slot are also adjusted to the viscosity of the liquid or semi-liquid material 8 fed to the insert 21. From the section in FIG. 6, shown in a rather larger scale than in FIG. 5, it may be seen that the member 19 moves through the soil course 6 leaving behind it a ribbon 10 of material for mixing-in, the ribbon having a substantially constant width and a height in the soil course corresponding to the distance between the upper opening 25 and the lower opening 25 shown in FIG. 5.

A detail of a material injecting member 3 and a supply means 30 for the material is shown in FIG. 7. The material supply means 30 consists, as is indicated in FIG. 2, of a stirrup-shaped trough which is stationarily mounted on a fixed frame 32 or the like. The bottom of the trough 30 is completely open to form feed opening 33. The lower portion of the trough is provided with outwardly directed flanges 34, 35 and the endless carrier 18 is provided with guiding slots, slot 36 for example, co-acting with the flanges and guiding the links, the material injecting members 3 being firmly united with them in relation to the trough 30. In a manner not shown here, the trough 30 is supplied with material which is to be introduced into the soil course 6 through which member 3 is moved. As member 3 comes in under the right-hand end 37 of the trough 30 in FIG. 2, it will be supplied with material via the trough opening 33 and this material is introduced into the soil course and mixed into it by the members 3 working along curves 41.

Even if only the members 3 furthest forward in the direction of travel 13 have been mentioned above as being material distributors, the rear members 3 can also supply material, in which case a special soil working device 42, as indicated in FIG. 2, is present to mix the material into the soil course. Such a mixing device 42 can be made as a harrow with rigid pins or as a processing device with pins or rods known per se.

The apparatus can be pulled by a tractor or the like or be a part of a special vehicle. It is further possible to make the material injecting members 3 and 19 in a way other than that shown in the specific working examples. The insert 21 in FIGS. 5 and 6 may be an integral part of member 19, for example. The illustrated trough 30 for supplying material to members 3 is also only to be regarded as an example of possible material feeding devices. In the case, for example, where all the members are supplied with material, this can take place via a hopper or container mounted above each member and having a connection to the feed opening 9.

The illustrated carrier 18 which moves the material injecting members in an oval path can also be replaced by a reciprocating carrier, consisting, for example, of a box beam or the like, having material injection members 3 or 19 arranged in a row transverse to the direction of movement of the carrier. This beam is driven backwards and forwards with such strokes that the whole width of the area to be worked is moved through by the material injecting members. In a row behind the material injecting members, which are all thought to supply material during the whole of the movement, there is arranged at least one row of pins or similar projecting down into the soil course, these being moved transversely to the direction of movement of the vehicle. An apparatus of the type shown in FIG. 2 is however to be preferred, because it requires less power. The outlet of each material injecting member 3 or 19 can be so formed that the thickness of the substantially vertical ribbon 10 varies depending on the desired admixture at different depths in the soil course. It happens quite often that an upper layer of a soil course is to have greater strength than a lower layer, i e the upper layer is to have more stabilizing material than the lower layer. Up to now, a first working-in run has been made through the whole of the soil course, with an amount of stabilizing material corresponding to the admixture required for the lower layer, and thereafter further stabilizing material has been worked into the upper layer. Two working-in operations must thus be carried out. By a suitable design of the outlets on the material injecting members 3 or 19 of the present invention, stabilizing may be carried out in a single operation.

It is preferred that the material is continually agitated during passage through the material injecting members. It can always be ensured hereby that the volumetric density is kept constant.

One embodiment is characterized in that agitator and/or discharging means in the material injecting members are rotated at a speed dependent on the travelling speed of the material injecting members along their track. In this way, an adjustment to the travel of the material injecting members across the travelling direction of the vehicle is accomplished, whereat the accuracy of proportioning out the material increases.

It is thereby suitable that the rotational speed is variably dependent on the speed of travel of the material injecting members, so that an adjustment of the rotational speed is permitted during operation.

An especially simple and expedient method is obtained if the material is supplied to the material injecting members from a supply container on the vehicle substantially only at their movement in a curved portion of the endless track. The material injecting members will thus be filled twice while passing through one circuit of the track. They can thereby be given a simple construction with small, neat dimensions and in spite of this include agitating and proportioning means, which ensures the good result offered by the method according to the invention.

The invention also relates to an apparatus for blending ground stabilizing material in solid or liquid form into a ground layer while carrying out the above-mentioned process, said apparatus comprising a carrier travelling in an endless track above the ground layer, and having a number of material injecting members, said carrier being mounted on a mobile vehicle accommodating at least one storage container from which material is transferred to the material injecting members, from which in its turn a substantial part of the material feed to the ground layer occurs during the movement of the ground injecting members along a substantially linear portion of the endless track across the travelling direction of the vehicle, said apparatus substantially characterized by means in the material injecting members for agitating the material during passage through the members, and means for variably proportioning the material at its departure from the material injecting members.

An apparatus of this kind can be made simply in practice, and in spite of this can provide great accuracy and reliability in the proportioning function.

It is preferred that the agitating means and proportioning means are mounted on a rotatable vertical shaft in the material injecting members.

As both agitating means and proportioning means are on the same vertical shaft, expedient adjustment of both operations to each other is accomplished. The discharged material is also carefully homogenized, which is a condition for the good proportioning result.

In an embodiment preferred in practice, the vertical shaft is caused to rotate via a circular element preferably at the upper end of the material injecting members, the element engaging against and rolling out a path along the travel of the material injecting members. It is suitable that the relative distance here between the element and the path is adjustable for varying the rotational speed of the shaft.

The element can thus consist, for example, of an elastic wheel, bearing on a path which can be displaced radially towards and away from the centre of the wheel. It is alternatively possible to keep the path fixed and allow the diameter of the wheel to vary. In practice this can be arranged by having the wheel consist of an inflatable rubber wheel with variable pressure.

The rotatable element e g the rubber wheel, is to advantage mounted on a rotatable hopper-shaped filling portion in the upper end of the material injecting members.

In order to achieve even proportioning, the proportioning means can contain a propeller-like element with an adjustable pitch, mounted on the shaft. Such a proportioning means can to advantage be made so that the propeller blades assume a substantially horizontal attitude i e so that no discharge is effected, when some obstacle should arise in the vertical discharging slots. If the proportioning means assumes such an attitude that discharge of material is substantially reduced, the risk of disturbance resulting from build-up of the continuous material flow through the apparatus is avoided.

To allow discharge at different levels, the material injecting member has at its lower portion two or more slots spaced vertically, which have adjustable aperture size.

An embodiment of the apparatus preferred in practice is characterized in that a rotatable disk or disks is situated in the region of the curved portions of the track between the storage containers and the upper portions of the material injecting members, said disks having holes with diameters corresponding to said upper portions, and being arranged for rotation at a speed such that the hole centers move together with the centers of the material injecting members.

By means of an apparatus of this kind there is achieved a simple and reliable apparatus for transferring material from the storage containers to the material injecting members and from there to the ground. The apparatus in its entirety can in actual fact be said to form a closed system where the effect from outside factors will be small or non-existent.

Figure 10:
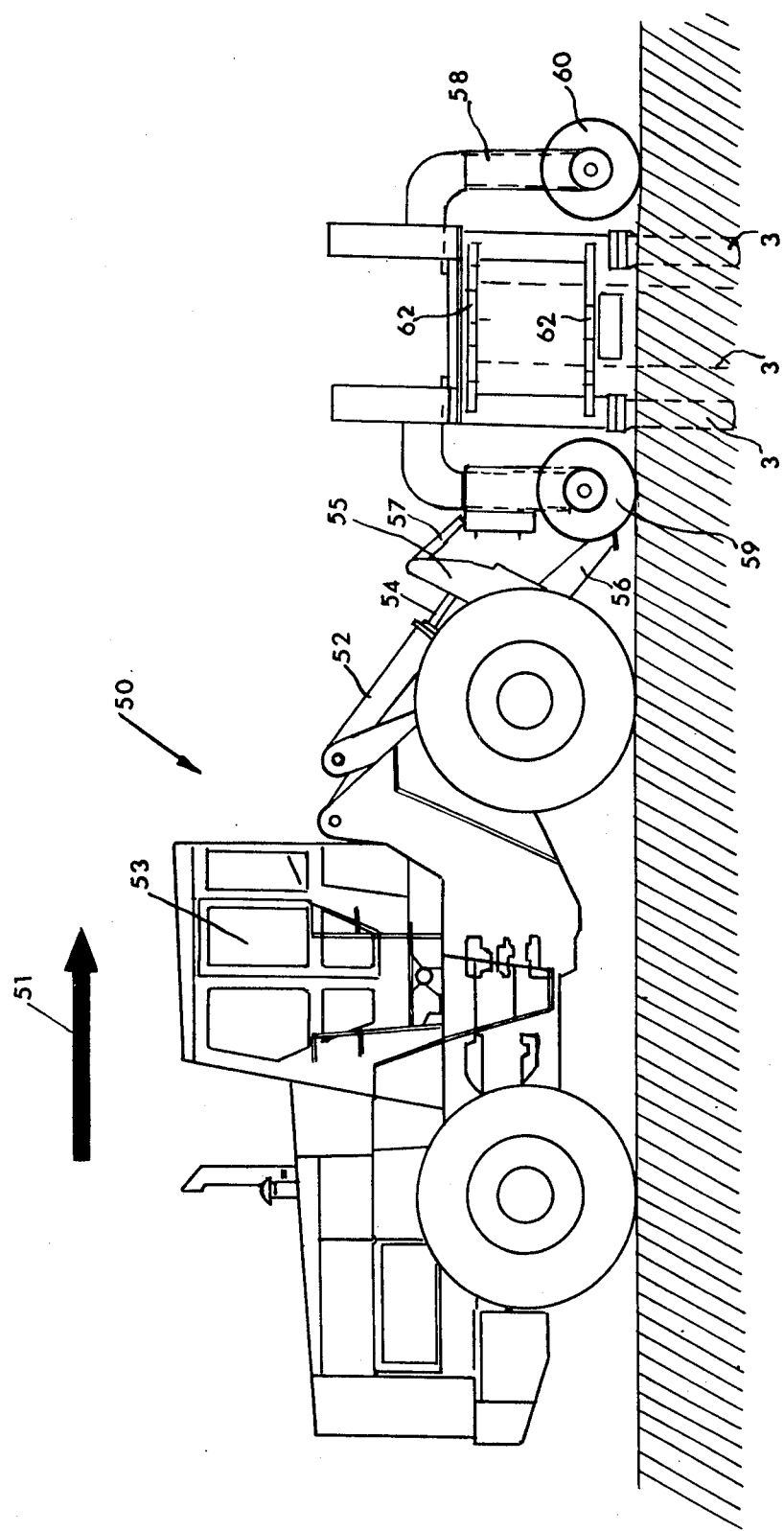
Figure 11:
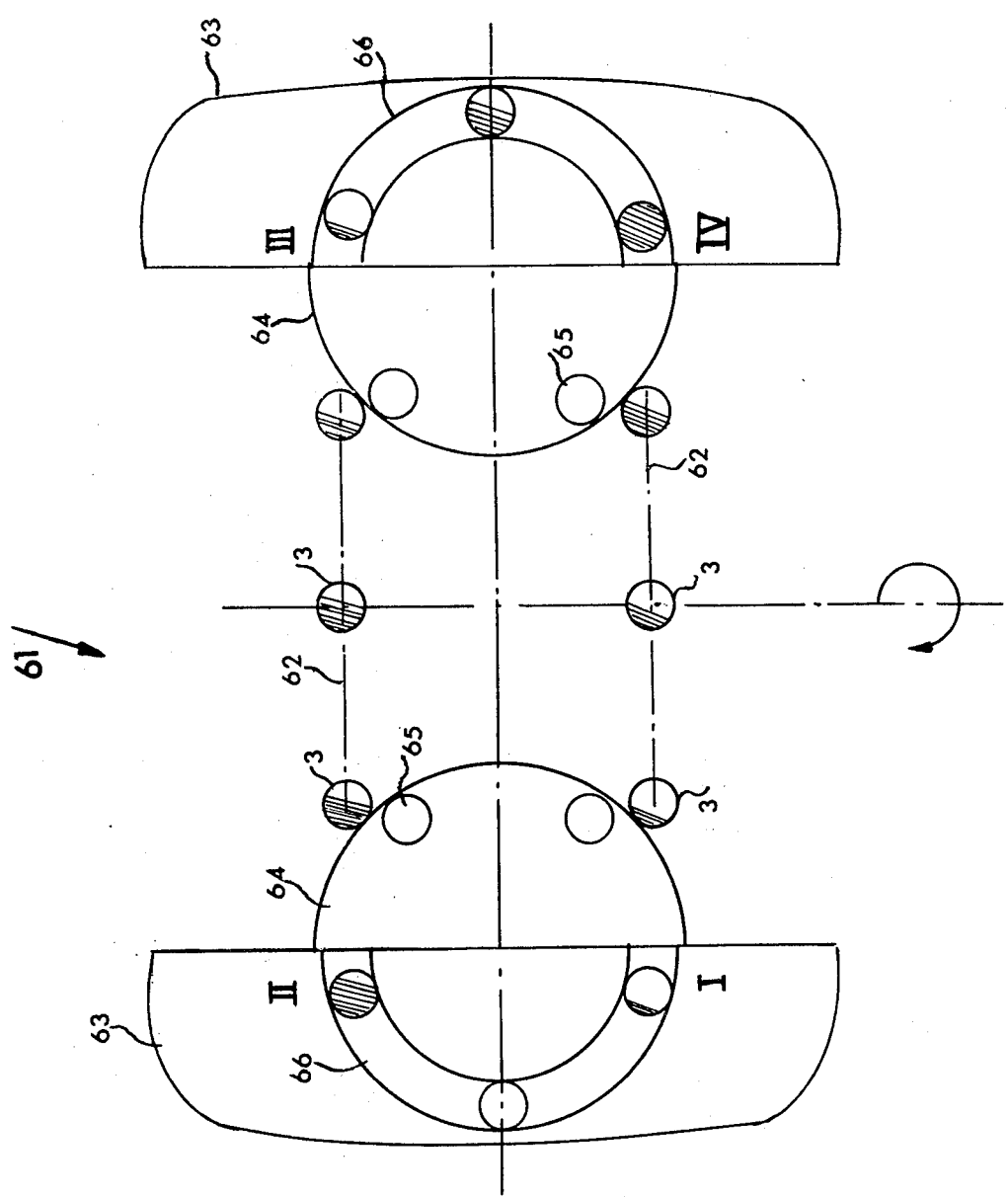
Figure 12:
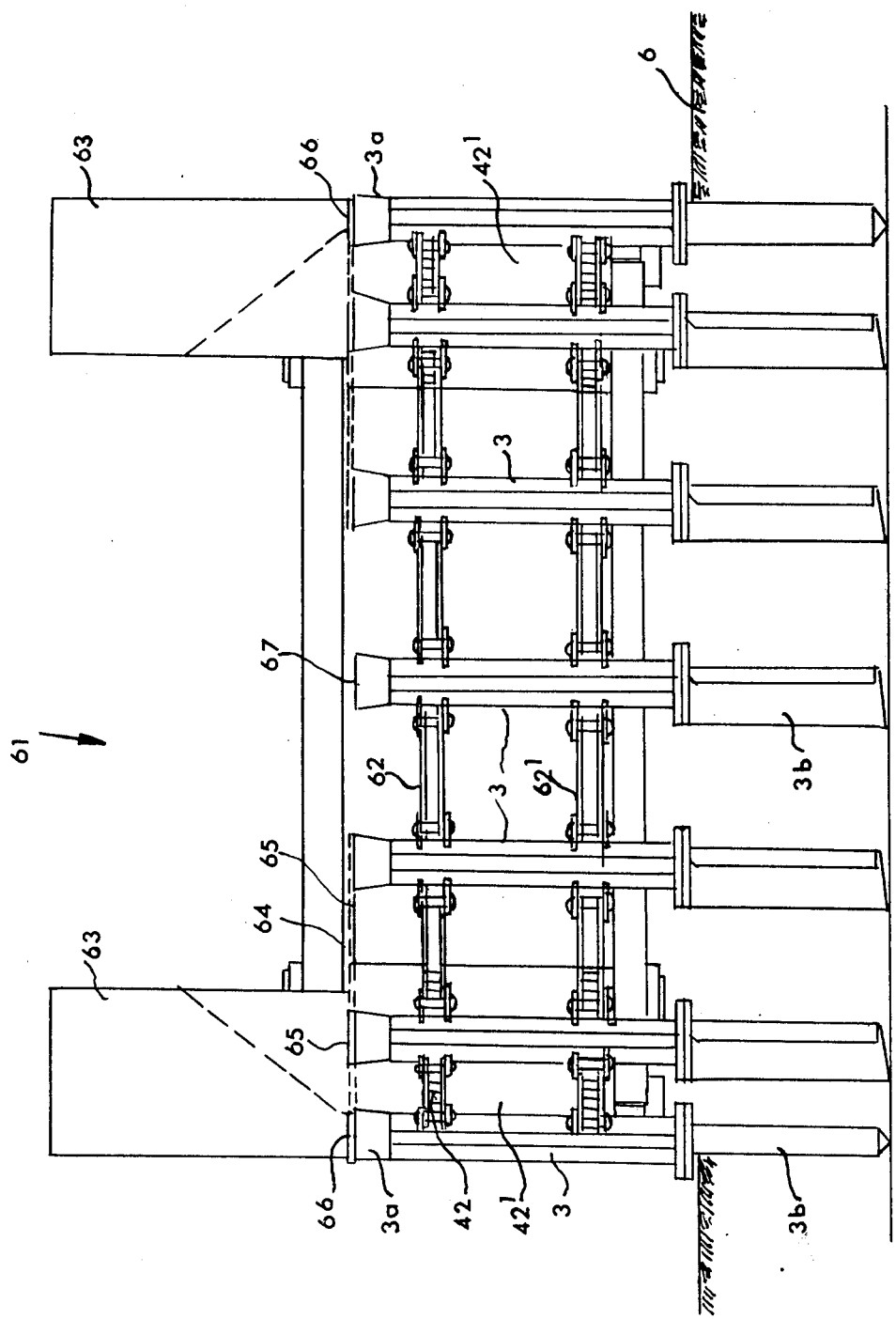

FIG. 10 shows a tractor 50 arranged to be driven over the ground layer 6 which is to be stabilized in the direction of the arrow 51. The tractor 50 is provided with one or more hydraulic cylinders 52, operated from the driving cabin 53 of the tractor 50. The hydraulic cylinder 52 shown has a piston 54 acting on a pivoting arm 55, the lower end of which is pivotably mounted on the tractor chassis in a way not more closely shown here. A lifting arm 56 is rigidly connected to the lower portion of the pivoting arm 55, and one end of a guiding arm 57 is pivotably connected to the upper portion of the pivoting arm 55. The other end of the guiding arm is pivotably connected to the machine frame 58 carrying the equipment according to the invention. The free end of the lifting arm 56 is pivotably connected to the frame 58 in a way not more closely shown here. When the piston 54 is retracted in the cylinder 52, the pivoting arm 55 with the fixedly attached lifting arm 56 will be swung anticlockwise and the whole machine frame 58 with the equipment according to the invention will be lifted upwardly so that the material injecting members 3 leave the ground layer. In FIG. 10 the machine frame 58 is shown provided with wheels, e g wheels 59 and 60, the frame suitably being provided with four wheels, so that it can easily be driven over the ground surface. However, it is also possible to have the equipment hanging in the described lifting means and thus remove the wheels. It should be noted that in FIG. 10 only four material injecting members have been drawn in, whereof two have been indicated by dashed lines. The frame 58 is not shown in FIGS. 11 and 12.

The apparatus 61, for mixing into a ground layer a ground stabilizing powdery material, comprises a carrier in the form of a chain 62, 62' moving in an endless path above the ground surface. Both chains or link means, which are for example of the type shown in FIGS. 8, 9 run over chain wheels 42, as previously described, and these chain wheels are driven by motors (not shown here) mounted in a motor house 42'. The motors can, for example, be hydraulic motors driven by pressure medium from the hydraulic power source of the vehicle 50. The carrier supports a number of material injecting members 3 having an upper supply portion 3a (FIG. 13) and a lower discharging portion 3b.

From the storage container 63 on the frame 58, material is transferred to the storage portion 3a of the material injecting members with the help of two rotating disks 64 with holes 65. The holes in the disk move at the same speed as the upper opening 67 of the material injecting members, this opening passing under the holes 65 in the disk 64 during transfer of the material. For this purpose the containers 63 have a lower opening 66 corresponding with the diameter of the holes 65.

In passing between the positions I–II (FIG. 11) the storage portion 3a of the material injecting members is filled. This is denoted by the shaded portion in the figure. While passing along the linear part of the track up to position III, the material injecting members are emptied, which is denoted in a corresponding manner. Refilling takes place between the positions III and IV, i e while passing the second storage container 3. Further emptying takes place as the material injecting members pass between positions IV and I.

As is most clearly apparent from FIG. 13, the material injecting members in this embodiment have the form of a cylinder, in which a number of agitator means (68) are mounted on a vertical shaft 69. The agitator means 68 have the task of keeping the material moving, so that it aquires a constant volumetric density while passing through the member.

Downwardly positioned on the upper portion 3a of the member, there is a proportioning means 70 with the task of supplying a lower administering member 71 with the prescribed amount of material per time unit. The proportioning means 70 consists of a propeller-like element which is infinitely adjustable by means of a rod 72, inside the central shaft 69, for adjusting different discharge amounts per time unit.

The tubular shaft 69 together with the agitator means 68 are driven by an upper wheel 73 with an elastic circumference 74 engaging against a track 75 so that the wheel rolls against the track 75, causing the shaft 69 to rotate. The track 75 can be displaced radially towards or away from the centre of the wheel 73. It is alternatively possible to make the track fixed and instead make the diameter of the wheel adjustable.

By adjusting the relative distance between the centre of the wheel 73 and the track 75, the rotational speed of the shaft 69, the agitating means 68 and the proportioning means 70 can be increased or decreased while the machine is in operation thus allowing variation in the amount of material discharged.

The portion 69a of the shaft 69 in the lower administering member 71 is also provided with agitator means 76, and furthermore discharging means 77. As mentioned hereinbefore the proportioning means 70 has a propeller-like appearance.

In FIGS. 18 and 19, the propeller-like means is illustrated with its largest pitch, giving a large proportioned amound. In FIGS. 20 and 21 the propeller means is horizontal instead, no discharge being achieved. The arrangement can hereby be such that the pitch of the propeller means is automatically adjustable against spring bias (not shown) in response to the resistance to discharge in the lower part of the proportioning means.

In the embodiment shown in FIG. 13, the proportioning means 70 coacts with a means 78 adapted for bringing down the material into the administering member 71.

The discharging means 77 discharges the material into the ground 6 through two or more vertical slots 79, the size of which can be adjusted by a means 80 (FIG. 17). The discharged amount of material per time unit can thereby be accurately regulated. By placing the slots more or less diametrally or directly diametrally to each other and nearly at right angles, or at right angles, in relation to the travel direction of the material injecting members, the material is mixed into the ground 6 in two vertical layers.

Figure 22:
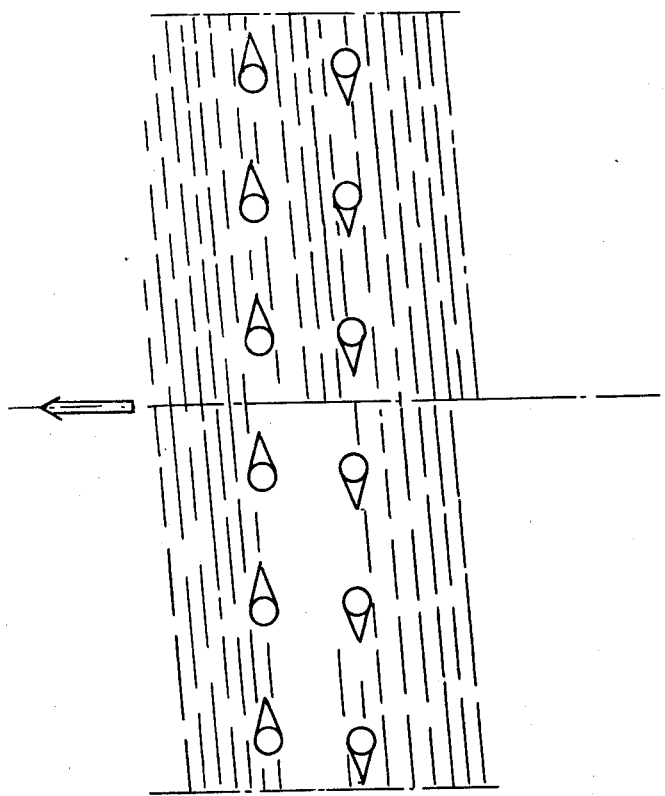

FIG. 22 illustrates the distribution of material proportioned to the ground after the passage of an apparatus according to the invention.

I claim:

1. In a method of mixing a soil stabilizing material in solid or liquid form into a soil course by means of a carrier transportable over the surface of soil and having a plurality of material injecting members, said method comprising the step of moving the plurality of material injecting members through the soil course in a closed path relative to the carrier while the carrier is being transported over the surface of the soil, the improvement wherein the closed path is in the shape of two half circles connected by two substantially straight portions which are tangential to the half circles, said half circles having the least possible radius.

2. A method as claimed in claim 1 wherein the material injecting members are moved at a substantially constant speed around the closed path.

3. A method as claimed in claim 1 wherein the soil stabilizing material is injected into the soil course by the material injecting members throughout the closed path which they travel.

4. A method as claimed in claim 1 wherein the soil stabilizing material is not injected into the soil course by the material injecting members while they are moving on one of the straight portions of the closed path.

5. A method as claimed in claim 1 wherein the soil stabilizing material is injected into the soil course by the material injecting members at a constant rate.

6. A method as claimed in claim 1 wherein the two substantially straight portions of the closed path are substantially perpendicular to the direction of motion of the carrier.

7. A method as claimed in claim 1 wherein the amount of soil stabilizing material injected into the soil course by the material injecting members varies at different depths in the soil course.

8. In a method of mixing a soil stabilizing material in solid or liquid form into a soil course by means of a carrier transportable over the surface of the soil and having a plurality of material injecting members, said method comprising the step of moving the plurality of material injecting members through the soil course in a closed path relative to the carrier while the carrier is being transported over the surface of the soil, the improvement wherein the closed path includes at least one substantially straight portion which is not substantially parallel to the direction of motion of the carrier and the soil stabilizing material is injected into the soil course while the material injecting members are moving along said substantially straight portion of the closed path.

9. A method as claimed in claim 8 wherein said substantially straight portion is substantially perpendicular to the direction of motion of the carrier.

10. A method as claimed in claim 8 wherein the material injecting members are moved at a substantially constant speed around the closed path.

11. A method as claimed in claim 8 wherein the soil stabilizing material is injected into the soil course by the material injecting members throughout the closed path which they travel.

12. A method as claimed in claim 8 wherein the soil stabilizing material is injected into the soil course substantially only while the material injecting members are moving along said substantially straight portion of the closed path.

13. A method as claimed in claim 8 wherein the amount of soil stabilizing material injected into the soil course by the material injecting members varies at different depths in the soil course.

14. A method of mixing into a ground layer a ground stabilizing material in solid or liquid form, whereat a number of material injecting members are caused to move in an endless path on a mobile vehicle so that a substantial part of the material discharge from the members takes place at their movement in a substantially linear portion of the path across the direction of vehicle movement, characterized in that the material is agitated while passing through the material injecting members and is proportioned variably on being discharged, so that a predetermined amount per time unit leave the material injecting members.

15. A method as claimed in claim 14, characterized in that the material is continuously agitated while passing through the material injecting members.

16. A method as claimed in claim 14, characterized in that the agitator and/or discharge means in the material injection members rotates with a speed depending on the travelling speed of the material injecting members along their path.

17. A method as claimed in claim 16, characterized in that the rotational speed is varied in response to the travelling speed of the material injecting members.

18. A method as claimed in claim 14, characterized in that material is supplied to the material injecting means substantially only during their movement in a curved portion of the endless path.

19. A method as claimed in claim 14, characterized in that the material is discharged into the ground in two or more vertical layers.

* * * * *